March 8, 1960     F. L. FRANZEN ET AL     2,927,613
STUMP DESTROYER
Filed Oct. 16, 1958     3 Sheets-Sheet 1
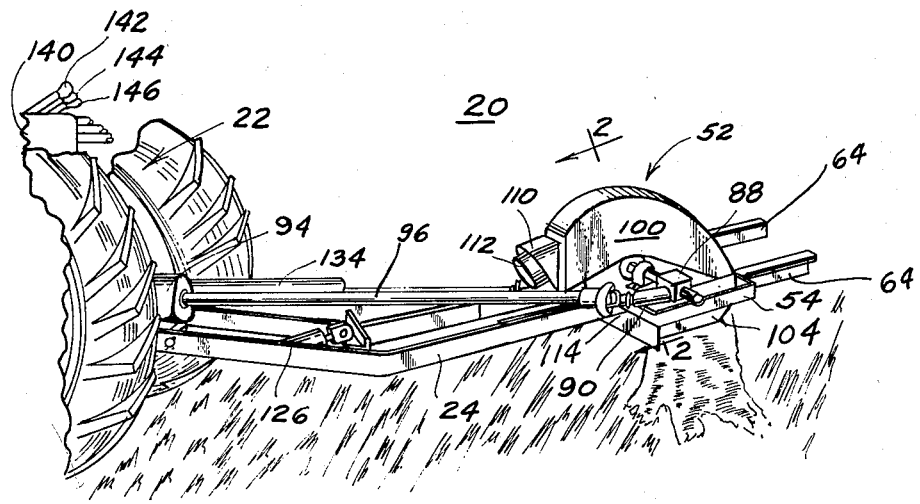
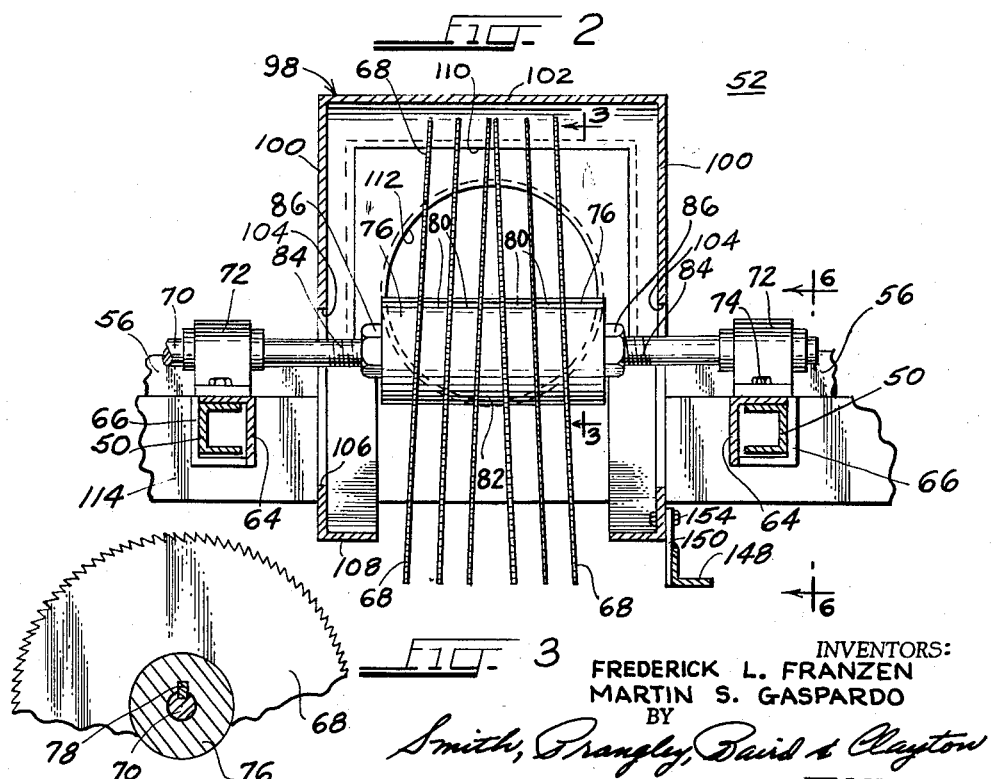
INVENTORS:
FREDERICK L. FRANZEN
MARTIN S. GASPARDO March 8, 1960 F. L. FRANZEN ET AL 2,927,613
STUMP DESTROYER
Filed Oct. 16, 1958 3 Sheets-Sheet 2

INVENTORS:
FREDERICK L. FRANZEN
MARTIN S. GASPARDO

March 8, 1960   F. L. FRANZEN ET AL   2,927,613
STUMP DESTROYER
Filed Oct. 16, 1958   3 Sheets-Sheet 3
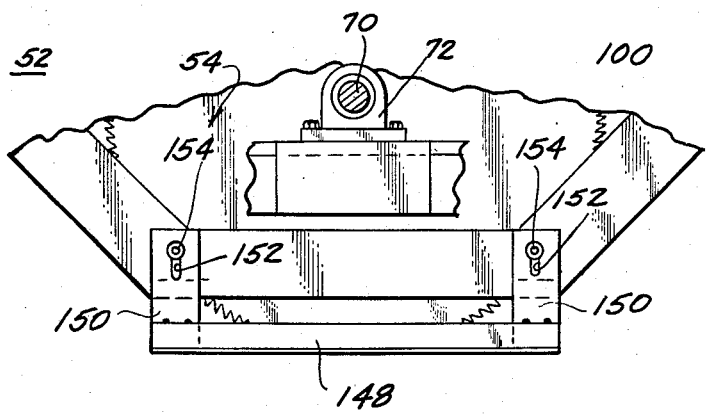
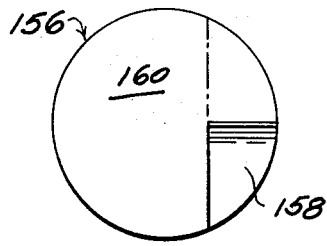
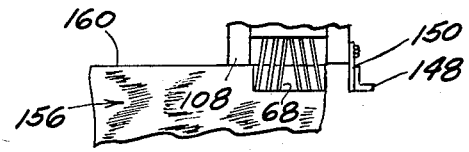
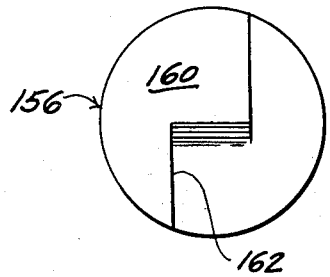
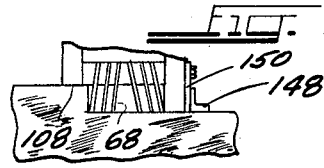
INVENTORS:
FREDERICK L. FRANZEN.
MARTIN S. GASPARDO
BY
Smith, Grangley, Bairdy Clayton
Att'ys.

United States Patent Office 2,927,613
Patented Mar. 8, 1960

2,927,613

STUMP DESTROYER

Frederick L. Franzen, Manville, and Martin S. Gaspardo, Long Point, Ill.

Application October 16, 1958, Serial No. 767,733

7 Claims. (Cl. 144—2)

This invention relates to machines for removing stumps and particularly to machines of that type in which the portion of the stump above the ground is effectively removed and destroyed.

In the usual process of cutting down trees, a substantial portion of the tree will remain above the ground in the form of a stump. This is true even when certain modern tree cutting apparatus is utilized. The presence of such stumps is undesirable in that they present safety hazards and interfere with cultivation of the ground around the stump. Various means have been devised heretofore to remove or destroy such stumps. In one form of such machines the stump is cut up into fine parts of the order of saw dust whereby readily to dispose thereof. Prior machines of this type have been large and bulky and in general have required either a special machine for mounting and operation thereof or have required large size tractors. Certain of the prior machines have also been inconvenient to use in that the entire machine including the prime mover therefor had to be shifted repeatedly in order to destroy a single large stump.

Accordingly, it is an important object of the present invention to provide an improved machine for removing stumps, and more particularly a machine of the type set forth which also destroys the stump by cutting it into small particles on the same order of size as saw dust.

Another object of the invention is to provide a machine of the type set forth which can be readily secured to and powered by a moderate size prime mover such as an ordinary farm tractor.

Yet another object of the invention is to provide a stump remover of the type set forth which is more easily operated in that the prime mover carrying the machine need not be moved during the removal of even the larger size stumps.

Still another object of the invention is to provide a machine of the type set forth in which the cutting member is so constructed and mounted that it can be moved upwardly and downwardly, toward and away from the prime mover, and to either side whereby effectively to destroy even the larger stumps without moving the prime mover mounting the stump destroyer.

In connection with the foregoing object it is another object of the invention to provide a machine of the type set forth which can cut a stump into the ground and to a point disposed a substantial distance below the ground level.

Yet another object of the invention is to provide in a machine of the type set forth an improved cutter construction which is more smooth in operation and which can more conveniently cut the stump material to the desired small particle size.

Still another object of the invention is to provide a stump destroyer of the type set forth in which means is provided effectively to remove the pieces of the stump from the cutting area and means can also be provided to collect the pieces as they are formed.

Yet another object of the invention is to provide an improved control system for moving the cutting member during the stump destroying operation.

Still another object of the invention is to provide an improved support for the cutting member which reduces the strain placed upon the mounting frame therefor and the associated prime mover.

These and other objects and advantages of the invention will be better understood from the following description when taken in conjunction with the accompanying drawings. In the drawings wherein like reference numerals have been utilized to designate like parts throughout:

Figure 1 is a perspective view of a stump destroyer made in accordance with and embodying the principles of the present invention, the destroyer being shown mounted on a prime mover and in operative position upon a stump to be destroyed;

Figure 2 is an enlarged view in vertical section through the machine of Figure 1 substantially as seen in the direction of the arrows along the line 2—2 of Figure 1;

Figure 3 is a fragmentary view in section through the cutting head substantially as seen in the direction of the arrows along the line 3—3 of Figure 2, the section being on a slightly reduced scale;

Figure 6 is a fragmentary view partly in section illustrating the adjustable support for the cutting head; and Figures 7 through 10 digrammatically illustrate the method of destroying a stump using the machine of the present invention.

Figure 4:
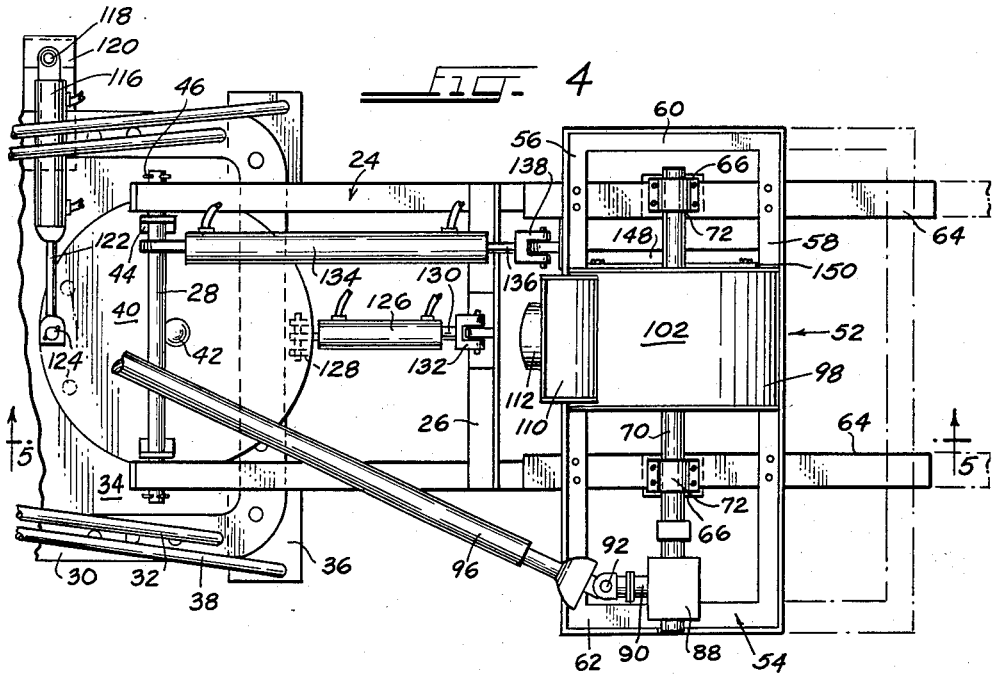
Figure 4 is a plan view on an enlarged scale of the stump destroying machine and illustrating particularly the mounting thereof on a prime mover such as an ordinary farm tractor.

There is shown in Figure 1 of the drawings a stump destroyer generally designated by the numeral 20 mounted upon and supported by an ordinary farm tractor designated by the numeral 22. The machine 20 has the parts thereof mounted upon a frame including a pair of parallel angular frame members 24 (see Figs. 4 and 5) which are interconnected by a cross member 26 and a cross shaft 28. All of the parts of the machine 20 are mounted upon the frame members 24 and the frame members 24 in turn are mounted upon the tractor 22 for pivotal movement with respect thereto.

More specifically, the tractor 22 is provided with the usual drawbar 30 having a pair of bracing rods 32 interconnecting the rear portion of the drawbar 30 and the main frame of the tractor 22. Mounted on the drawbar 30 and stationary with respect thereto is a support plate 34 which may be secured to the drawbar 30 in any suitable manner such as by welding for permanent installation or by suitable bolts for a temporary or removable installation. Additional bracing for the drawbar 30 may be provided by means of the angle irons 36 which are connected to the main tractor frame by means of tie rods 38. Mounted upon the plate 34 for rotation with respect thereto is a substantially circular mounting plate 40. Pivotal interconnection is made between the plates 34 and 40 by means of a bolt or king pin 42. This permits ready rotation of the plate 40 in a plane substantially parallel to the plate 34 and ordinarily in a horizontal plane when the tractor 22 is positioned on level ground.

The shaft 28 is pivotally mounted upon the plate 40 by means of a pair of L-shaped brackets 44 fixedly mounted upon the plate 40 and having aligned apertures therein to receive the shaft 28 therethrough. The shaft 28 also extends through aligned apertures in the frame members 24 and is held in operative position with respect thereto by means of cotter pins 46. This mounting of the shaft 28 and the frame members 24 permits pivotal movement of the frame members 24 in a vertical direction with respect to the support plate 40 and since the plate 40 can be turned in a horizontal direction, the frame members 24 can likewise be positioned in any desired horizontal position by rotating the support plate 40. Thus substantially universal positioning of the frame members 24 can be achieved with respect to the tractor 22.

Figure 5:
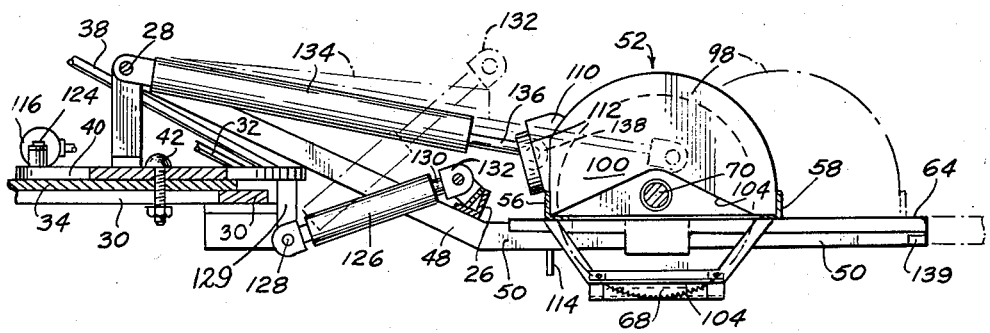
Figure 5 is a view in vertical section substantially as seen in the direction of the arrows along the line 5—5 of Figure 4, the parts being shown in various adjusted positions by dashed lines.

Referring to Figure 5 it will be seen that each of the frame members 24 is comprised of two angularly disposed sections 48 and 50. The frame members 24 including the rearward section 50 are U-shaped in cross section with the free edges of the frame members directed inwardly toward each other as is illustrated in Figure 2 of the drawings.

Mounted upon the rearwardly directed frame portions 50 is the cutting head which is generally designated by the numeral 52. The various parts of the cutting head 52 are mounted upon an auxiliary frame or bed 54 which is constructed and arranged to slide longitudinally along the frame sections 50. More specifically, the frame 54 includes a first pair of parallel frame members 56 and 58 which are disposed transversely to the main frame members 24 and a pair of longitudinally extending frame members 60 and 62 which interconnect the frame members 56 and 58. In order to mount the frame 54 upon the frame sections 50 for movement therealong, a pair of angle iron members 64 is provided, the members 64 being suitably secured as by welding to the frame 54 and particularly to the transverse frame members 56 and 58 thereof. The horizontal flanges of the members 64 ride upon the upper horizontal flanges of the frame members 50. In order to insure that the members 64 are retained upon the frame sections 50, other angle iron pieces 66 are welded to the members 64 to form an enclosed box-like structure as may be best seen in Figure 2, the box-like structure surrounding and slidingly receiving the frame sections 50 therein.

The wood cutting head 52 includes a plurality of saw blades 68 which are fixedly mounted upon and rotate with a suitable transverse support shaft 70. The shaft 70 is supported by a pair of spaced apart bearings 72 which are in turn mounted upon the frame 54 in any suitable manner such as by bolts 74. In order to cut a substantial portion of the stump with each of the saw blades 68, each blade is inclined with respect to the axis of rotation of the support shaft 70. It has been found advantageous to incline the blades 68 at an angle of approximately 2° 3′ to the axis of the shaft 70. It further is desired to provide a plurality of the saw blades 68, six having been shown for purposes of illustration in the drawings. The saw blades are arranged in two groups of three, one group being inclined in one direction toward the longitudinal center of the shaft 70 and the other group being inclined in the other direction and toward the first group as may be best seen in Figure 2 of the drawings. If a 28 inch diameter blade is used, the blades will be spaced apart one inch within each group and the groups juxtaposed whereby to provide a cutting head having a total effective cutting width of about eight inches.

In order to hold the blades 68 in the desired inclined position, a plurality of suitable spacer blocks is provided. More specifically, there is provided on each end of the cutting head a block 76, each block 76 having an inwardly facing surface inclined at the desired angle with respect to the axis of the shaft 70. In order to insure that the block 76 and the associated saw blades are held at the proper angular position with respect to the shaft 70, keyways are provided therein to receive a suitable key 78 (see Fig. 3). A plurality of intermediate spacers 80 is provided, each of the spacers 80 having both surfaces thereof inclined with respect to the axis of the shaft 70. Disposed between the two oppositely inclined groups of blades 68 is a central spacer 82. It is to be understood that each of the spacers 80 and 82 is also provided with a keyway therein to receive the key 78.

The various spacers and the saw blades are held in fixed assembled relationship with respect to the drive shaft 70. To this end the shaft 70 is provided with threaded sections 84 which receive thereon nuts 86. The nuts 86 bear against the outer faces of the spacer blocks 76 whereby to hold the various blocks and blades in firm assembled relationship.

One end of the shaft 70 extends outwardly to the adjacent frame member 62 and connects with the output of a gear box 88 which is mounted on the frame 54. The input to the gear box 88 is in the form of a shaft 90 which is connected by means of a universal joint 92 to a power take-off 94 (see Fig. 1 of the drawings) by means of the usual extensible shaft 96. The power take-off 94 is on the prime mover of the tractor 22 and is the usual power take-off provided on such vehicles. The usual farm tractor can be used to drive the cutting head at approximately 1,000 r.p.m. when the blades are set to cut a depth of two inches. The cutting head will cut a strip 8 inches wide when operated in this manner.

In operation, the cutting head 52 by means of the saw blades 68 literally destroys the stump by cutting it into small pieces of a size such as to form sawdust. Such a small comminution of the stump is obtained because each tooth on the circumference of each blade 68 travels in a path which is moving laterally whereby each saw blade cuts a piece of stump having a width slightly greater than one inch. The described construction is in dynamic balance for rotation with the shaft 70 so that there is substantially no vibration or jarring caused by operation of the cutting head.

It is desired that the sawdust created by destruction of a stump be delivered to a predetermined point so that it will not fall into moving parts whereby to interrupt operation thereof. To this end a housing generally designated by the numeral 98 is provided having a pair of curved side walls 100 joined by a part-cylindrical cross wall 102. As may be best seen in Figure 5 of the drawings, the side walls terminate along an edge 104 which is positioned to receive the shaft 70 therebeneath. Suitable guide flanges 108 are also provided which extend downwardly from the frame 54 and serve to act as rests to support the cutting head 52 on the upper surface of a stump being cut as will be described more fully hereinafter.

The sawdust created by the cutting of a stump is thrown around within the housing 98 and is discharged through a hood 110 which is directed inwardly toward the associated prime mover, the hood 110 being mounted on the housing 98 and communicating with the interior thereof. A short section of pipe 112 is preferably mounted on the hood 110 whereby to direct the sawdust downwardly. A depending plate 114 is also provided in this connection (see Figs. 1, 2 and 5).

Means is provided to rotate the mounting plate 40 about the king pin 42 and with respect to the fixed support plate 34. To this end a suitable hydraulic motor 116 of the expansion-contraction type has been provided. One end of the motor 116 is pivotally mounted as at 118 on a bracket 120 which is in turn mounted on the fixed plate 34. The piston rod 122 of the motor 116 has the outer end thereof pivotally connected to the plate 40 as at 124. The pivot point 124 is adjacent to the periphery of the mounting plate 40 and as is illustrated in Fig. 4 of the drawings is in longitudinal alignment with the pivot pin 42 when the frame member 24 extends directly rearwardly from the associated prime mover. Expansion of the motor 116 tends to move the pivot point 124 downwardly as viewed in Fig. 4 whereby to rotate the mounting plate 40 in a counterclockwise direction. This swings the cutting head 52 upwardly as viewed in Figure 4. Contraction of the motor 116 rotates the mounting plate 40 in a clockwise direction whereby to move the cutting head 52 downwardly as viewed in Figure 4. It will be seen that by means of the motor 116 any desired lateral position of the cutting head 52 can be achieved within limits without moving the associated prime mover 22.

Because stumps to be destroyed may be of different heights, it is likewise desirable to be able to move the cutting head 52 upwardly and downwardly. To this end a second hydraulic motor 126 has been provided. The cylinder of the motor 126 is pivoted as at 128 on a depending bracket 129 attached to the mounting plate 40. The piston rod 130 of the motor 126 is pivotally connected by means of a coupling 132 to the cross frame member 26. As may be best seen in Fig. 5 of the drawings, expansion of the motor 126 will urge the frame members 24 upwardly whereby to pivot them about the axis of the cross bar 28. It is contemplated that the parts may be moved from the position shown in solid lines to that illustrated in dashed lines. With the parts in the upper position illustrated by dashed lines in Fig. 5, contraction of the motor 126 serves to lower the cutting head 52. By means of the motor 126 the head 52 can be raised to be placed upon the upper surface of a stump and can thereafter be moved downwardly as the stump is destroyed and even into a position such that the lower portions of the saw blades are below ground level.

Certain of the stumps to be destroyed may have a substantial diameter. Accordingly, it is necessary to move the cutting head 52 toward and away from the associated prime mover in order to cut the entire girth of the stump. As has been explained above, the cutting head frame 54 is mounted so that it can be moved longitudinally along the frame sections 50. In order positively to control the movement and positioning of the cutting head 52, a third hydraulic motor 134 has been provided. The cylinder of the hydraulic motor 134 is pivoted upon the cross shaft 28. The piston rod 136 thereof is pivotally connected by means of a coupling 138 to the cutting head frame 54. By expansion of the motor 134, the cutting head 52 can be moved from the position shown in solid lines in Fig. 5 to that illustrated by dashed lines therein. Conversely, contraction of the hydraulic motor 134 will cause a reverse movement of the cutting head 52. Stops 139 are provided on the rear ends of the frame portions 50 to engage the pieces 66 thus limiting the distance that the head 52 can be moved rearwardly.

As has been explained above, preferably the motors 116, 126 and 134 are of the expansion-contraction type and are hydraulically actuated. The controls for the motors can be mounted in any suitable position such as beside the driver's seat as is illustrated in Fig. 1 of the drawings. More specifically a control box 140 is provided having control handles 142, 144 and 146 which control the hydraulic motors 116, 126 and 134, respectively. It is to be understood that suitable lines are provided from a source of hydraulic fluid under pressure through the controls and to each of the hydraulic motors. By suitably manipulating the controls 142, 144 and 146, the cutting head 52 can be placed in substantially any desired position behind the prime mover 22.

As has been explained above, the flange 108 on the under side of the cutting head housing 98 can serve as a rest or support for the cutting head during the cutting of a stump. As will be explained more fully hereinafter, the operation of cutting will gradually destroy the portion of the stump supporting one side of the housing. In effect one side of the housing will be resting upon a surface of the stump yet to be cut and the other side will be suspended over the surface which has just been cut, the distance between the housing and the surface just cut will be equal to the depth of cut or approximately 2 inches. With the housing supported only on one side, there might be a tendency for the housing to tilt whereby to place undue strain on the various operating parts thereof. In order to give support for both sides of the housing, an adjustable foot or support member 148 has been provided. As may be best seen in Fig. 2 of the drawings, the support member 148 is of angle iron construction and has one flange thereof disposed lowermost and horizontally. A pair of brackets 150 serves to mount the support 148 on the housing 54 and particularly one of the walls 100 thereof. Each of the brackets 150 has an elongated slot 152 therein (see Fig. 6) which receives a bolt 154 therethrough. By means of the slot 152 the position of the support member 148 can be adjusted.

Referring to Figs. 1 and 7 through 10 of the drawings, the manner in which a stump can be destroyed will be described in detail. The tractor 22 is put into operation whereby to supply hydraulic fluid to the various motors. Preferably the operator adjusts the hydraulic controls so that the cutting head 52 is positioned toward the tractor 22 and the frame members 24 are directed rearwardly of the tractor. The cutting head 52 is then raised by operation of the hydraulic motor 126 to a position such that it is higher than the top of the stump 156 to be destroyed. The operator then maneuvers the tractor until the cutting head 52 is directly above the stump 156. The cutting blades are then set into operation by engaging the power take-off 94. Power is supplied through the coupling 96 to the gear box 88 which in turn drives the shaft 70. The hydraulic motors are actuated so that the cutting head is dropped on the right hand side of the stump 156 as viewed in Figs. 7 and 9 and toward the forward or adjacent edge thereof. The blades 68 will cut into the stump and provide a cut out portion such as 158 in Fig. 7 of the drawings. The hydraulic motor 134 is then actuated to move the cutting head 52 rearwardly whereby to finish cutting the first longitudinal section of the stump. The cut can be two inches deep and is up to eight inches in width.

During this initial cut, both of the flanges 108 can rest upon the upper uncut surface 160 of the stump 156 provided that the stump surface 160 is flat. If the upper surface of the stump is not flat, then it must be flattened by means of the cutting head 52. After having finished the cut 158, the cutting head 52 is moved forwardly by contraction of the motor 134 and a second cut 162 is begun. During the cut 162, the flange 108 opposite the support member 148 will rest on the uncut surface 160 of the stump and the support member 148 will rest on and ride upon the freshly cut surface made by the cut 158 as may be best seen in Fig. 10 of the drawings. The cutting head 52 is then moved rearwardly by expansion of the motor 134 whereby to complete the cut 162. This operation is continued and repeated until the stump 156 has been completely destroyed.

If desired, a suitable container such as a sack can be mounted on the pipe 112 whereby to collect the sawdust formed by destroying the stump 156. This eliminates a portion of the undesirable mess which results from disintegrating the stump 156.

After the stump has been destroyed, the hydraulic motors can be actuated whereby to dispose the cutting head 52 rearwardly of the tractor and raised above the ground so that the tractor 22 can be driven to the next stump or returned to the owner's garage or some other suitable destination. Because of the construction and mounting of the stump destroyer, it can be readily removed from the tractor 22 and when desired again mounted thereon.

It will be seen that there has been provided a stump destroyer which fulfills all of the objects and advantages set forth above. Although one preferred form of the invention has been shown and described for purposes of illustration, it is to be understood that various changes and modifications can be made therein without depart-

We claim:

1. A stump removing machine adapted for connection to a tractor having a power take-off and a hydraulic pump, comprising a first frame adapted to be mounted rigidly on the tractor and to extend in the direction of movement of the tractor, a second frame adapted to extend in the direction of movement of the tractor, a first universal joint interconnecting said first and second frames for universal movement therebetween, an auxiliary frame slidably mounted on said second frame, a rotating cutting disk having a cutting tooth thereon mounted on said auxiliary frame with said disk in a substantially vertical plane, means for interconnecting the power take-off from the tractor and said disk for rotating said disk in said plane and including a second universal joint interconnecting adjacent shaft sections, first hydraulic motor means for causing relative movement of said second frame with respect to said first frame in a horizontal direction, second hydraulic motor means for causing movement of said second frame with respect to said first frame in a vertical direction, third hydraulic motor means interconnecting said second frame and said auxiliary frame to adjust the position of said auxiliary frame in a longitudinal direction along said second frame, and manual control means separate from said means for rotating the cutting disk for operating said hydraulic motor means, whereby to adjust the position of said cutting disk in a longitudinal direction along said second frame and to adjust the position of said second frame with respect to said first frame and thereby to adjust the position of said disk cutting tooth with relation to a stump.

2. A stump removing machine adapted for connection to a tractor having a power take-off and a hydraulic pump, comprising a first frame adapted to be mounted rigidly on the tractor and to extend in the direction of movement of the tractor, a movable mounting member pivotally mounted on said first frame, a second frame pivotally mounted upon said mounting member and adapted to extend in the direction of movement of the tractor, the connections between said frames and said mounting member providing a first universal joint interconnecting said first and second frames for universal movement therebetween, first hydraulic motor means and second hydraulic motor means interconnecting said frames and said movable mounting member to effect universal movement of said second frame with respect to said first frame, an auxiliary frame slidably mounted on said second frame, a rotating cutting disk having a cutting tooth thereon mounted on said auxiliary frame with said disk in a substantially vertical plane, means for interconnecting the power take-off from the tractor and said disk for rotating said disk in said plane and including a second universal joint interconnecting adjacent shaft sections, third hydraulic motor means interconnecting said second frame and said auxiliary frame to adjust the position of said auxiliary frame in a longitudinal direction along said second frame, and manual control means separate from said means for rotating the cutting disk for operating said hydraulic motor means, whereby to adjust the position of said cutting disk in a longitudinal direction along said second frame and to adjust the position of said second frame with respect to said first frame and thereby to adjust the position of said disk cutting tooth with relation to a stump.

3. The stump removing machine set forth in claim 2, wherein said first hydraulic motor means interconnects the first frame and the movable mounting member for causing relative movement of the second frame with respect to the first frame in a horizontal direction, and the second hydraulic motor means interconnects said movable mounting member and said second frame for causing movement of said second frame with respect to said first frame in a vertical direction.

4. A stump removing machine adapted for connection to a tractor having a power take-off and a hydraulic pump, comprising a first frame adapted to be mounted rigidly on the tractor and to extend in the direction of movement of the tractor, a movable mounting member pivotally mounted on said first frame, a second frame pivotally mounted upon said mounting member and adapted to extend in the direction of movement of the tractor, the connections between said frames and said mounting member providing a first universal joint interconnecting said first and second frames for universal movement therebetween, first hydraulic motor means and second hydraulic motor means interconnecting said frame and said movable mounting member to effect universal movement of said second frame with respect to said first frame, an auxiliary frame slidably mounted on said second frame, a shaft rotatably mounted on said auxiliary frame, a cutting disk having a cutting tooth thereon mounted on said shaft with said disk in a substantially vertical plane, means for interconnecting the power take-off from said tractor and said shaft for rotating said disk in said plane and including a second universal joint interconnecting adjacent shaft sections, said disk extending below said auxiliary frame and said interconnecting means whereby to permit said disk to cut into the ground below the surface thereof, third hydraulic motor means interconnecting said second frame and said auxiliary frame to adjust the position of said auxiliary frame in a longitudinal direction along said second frame, and manual control means separate from said means for rotating the cutting disk for operating said hydraulic motor means, whereby to adjust the position of said cutting disk in a longitudinal direction along said second frame and to adjust the position of said second frame with respect to said first frame and thereby to adjust the position of said disk cutting tooth with relation to a stump.

5. The stump removing machine set forth in claim 4, wherein a housing is provided surrounding said cutting disk on four sides and the top and having an opening at the upper portion of one of the sides thereof to permit movement of sawdust and debris out of said housing.

6. The stump removing machine set forth in claim 4, wherein a plurality of disks having cutting teeth thereon is provided on the rotating shaft, each of said disks having the plane thereof inclined with respect to the axis of rotation whereby to cut a portion of a stump substantially wider than each tooth, adjacent disks having the areas of cutting thereof overlapping.

7. The stump removing machine set forth in claim 4, wherein a guide flange is mounted on the housing adjacent to the lower extremity of the disk whereby to gage the depth of cut of said disk, and an adjustable guide member is mounted on the auxiliary frame to provide a bearing surface in substantial horizontal alignment with the lowermost portion of the path of travel of the cutting teeth.

References Cited in the file of this patent

UNITED STATES PATENTS

| | | |
|---|---|---|
| Re. 15,165 | McKoy et al. | July 26, 1921 |
| Re. 15,655 | McKoy et al. | July 17, 1923 |
| 8,612 | Patton et al. | Dec. 23, 1851 |
| 327,203 | Smith | Sept. 29, 1885 |
| 722,541 | Seymour | Mar. 10, 1903 |
| 733,744 | Raettig | July 14, 1903 |
| 1,262,601 | Royal et al. | Apr. 9, 1918 |
| 1,417,425 | Thompson | May 23, 1922 |
| 1,602,357 | Georgelis | Oct. 5, 1926 |
| 2,365,408 | Hillyer | Dec. 19, 1944 |
| 2,462,314 | Fuqua | Feb. 22, 1949 |
| 2,588,953 | Bausch et al. | Mar. 11, 1952 |
| 2,710,634 | O'Brien | June 14, 1955 |
| 2,820,493 | Davis | June 21, 1958 |